(12) United States Patent
Daudenarde

(10) Patent No.: US 6,418,450 B2
(45) Date of Patent: *Jul. 9, 2002

(54) DATA WAREHOUSE PROGRAMS ARCHITECTURE

(75) Inventor: Jean-Jacques Paul Daudenarde, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,557

(22) Filed: Jan. 7, 1999

Related U.S. Application Data

(60) Provisional application No. 60/072,505, filed on Jan. 26, 1998.

(51) Int. Cl.[7] ................................................ G06F 17/30
(52) U.S. Cl. ...................... 707/200; 707/10; 707/102; 707/104; 707/201
(58) Field of Search ................................ 707/104, 102, 707/10, 201, 101, 200; 703/22; 717/107, 109; 712/109

(56) References Cited

U.S. PATENT DOCUMENTS

| 5,408,654 A | 4/1995 | Barry |
| 5,455,945 A | 10/1995 | VanderDrift |
| 5,522,068 A | 5/1996 | Berkowitz |
| 5,559,692 A | 9/1996 | Telingator et al. |
| 5,574,910 A | 11/1996 | Bialkowski et al. |
| 5,596,747 A | 1/1997 | Katabami et al. |
| 5,721,915 A | 2/1998 | Sockut et al. |
| 5,832,496 A | * 11/1998 | Anand et al. ............ 707/102 |
| 5,870,746 A | * 2/1999 | Knutson et al. .......... 707/101 |
| 5,970,490 A | * 10/1999 | Morgenstern ............ 707/10 |
| 6,014,670 A | * 1/2000 | Zamanian et al. ........ 707/101 |
| 6,128,624 A | * 10/2000 | Papierniak et al. ....... 707/104 |
| 6,134,541 A | * 10/2000 | Castelli et al. ........... 707/2 |
| 6,230,309 B1 | * 5/2001 | Turner et al. ............. 717/1 |

FOREIGN PATENT DOCUMENTS

| JP | 0667950 | 8/1992 |
| JP | 07152615 | 11/1993 |
| JP | 08202597 | 1/1995 |
| JP | 09034758 | 7/1995 |

OTHER PUBLICATIONS

Atzeni, P., et al., "Semistructured and Structured Data in the Web: Going Back and Forth", *SIGMOD Record*, vol. 26, No. 4, pp. 16–23, Dec. 1997.

* cited by examiner

*Primary Examiner*—Jean M. Corrielus
(74) *Attorney, Agent, or Firm*—Fay, Sharpe, Fagan, Minnich & McKee, LLP

(57) ABSTRACT

A method, apparatus, and article of manufacture for a data warehouse programs architecture. Data in a database stored on a data storage device is transformed. Initially, a program template is retrieved that contains parameters. A business view is invoked with the program template. Under control of the business view, a transformation program is invoked that transforms source data to generate target data using the parameters provided in the program template.

76 Claims, 14 Drawing Sheets

DATA WAREHOUSE PROGRAMS ARCHITECTURE

PROVISIONAL APPLICATION

This application claims the benefit of U.S. Provisional Application No. 60/072,505, entitled "VW PROGRAMS (VWP) ARCHITECTURE," filed on Jan. 26, 1998, by Jean-Jacques Daudenarde, which is incorporated by reference herein.

CROSS-REFERENCE TO RELATED APPLICATION

This application is related to the following and commonly-assigned patent application:

Application Ser. No. 08/921,196, entitled "SCALABLE DATA WAREHOUSE ARCHITECTURE," filed on Aug. 29, 1997, by Linnette M. Bakow, et al., which is incorporated by reference herein now U.S. Pat. No. 6,058,394.

BACKGROUND OF THE INVENTION

1. Field of the Invention

This invention relates in general to database management systems performed by computers, and in particular, to systems that process data within database management systems.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (RASD) such as magnetic or optical disk drives for semi-permanent storage.

In recent years DBMSs have become increasingly popular for several factors, including the decrease in the cost of storage devices and the increased need to store and track electronic information. As DBMSs become increasingly popular, more and more data is stored in databases, and handling, storing, analyzing, archiving, moving, and collating the data becomes more of a concern to those utilizing such data.

To manage this increasing data load various software aids, sometimes referred to as utilities, have been developed. One thing that utilities have in common is that utilities assist users in managing data. They may be simple, such as a back up utility, which merely copies several files. They may be more complex, such as a structured query language interface, which has evolved into a standardized mechanism for manipulating data. They also may be complex and sophisticated on line analytical processing programs (OLAP) which are designed to do complex analytical processing.

Relational DataBase Management System (RDBMS) software using a Structured Query Language (SQL) interface is well known in the art. The SQL interface has evolved into a standard language for RDBMS software and has been adopted as such by both the American National Standards Institute (ANSI) and the International Standards Organization (ISO).

Today, a DBMS can instead be an object-oriented database management system (OODBMS). An object-oriented database is organized into objects having members that can be pointers to other objects. One of the key features of an OODMBS is the ability to navigate between objects using these pointers. Additionally, an object can have relationships to other objects. The objects contain references, and collections of references, to other objects in the database, thus leading to databases with complex nested structures.

Different types of data, relational and object, are being stored in data warehouses. The term "data warehouse" is used to describe large amounts of related data that are stored together. With the increased data that is stored, there has been an increasing complexity in using, retrieving, sorting and organizing data and the proliferation of number and complexity of utilities increasing skill is being demanded of those who use the databases. In addition because of the multiple uses of data within organizations, the same or closely related analyses can be repeated by different users, thereby giving rise to inefficiency as the effort that is used in one analysis is often repeated in another analysis.

Thus, there is a need in the art for an improved architecture which enables users to more easily work with utilities that operate within data warehouses.

SUMMARY OF THE DISCLOSURE

To overcome the limitations in the prior art described above, and to overcome other limitations that will become apparent upon reading and understanding the present specification, the present invention discloses a method, apparatus, and article of manufacture for a data warehouse programs architecture.

Data in a database stored on a data storage device is transformed. Initially, a program template is retrieved that contains parameters. A business view is invoked with the program template. Under control of the business view, a transformation program is invoked that transforms data at a source to generate data at a target using the parameters provided in the program template.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a data warehouse programs (DWP) architecture for aiding processing of data within a data warehouse. A data warehouse program is a program used within, for example, the data warehouse product, Visual Warehouse™, from International Business Machines, Corporation, Armonk, N.Y. In particular, a data warehouse program is a program, such as a File Transfer Program (FTP) command, a Backup Utility, or a Load Data Utility, that processes data in a data warehouse.

The DWP architecture enables a user to define a business view, which is an object that may be used to invoke a data warehouse program. Additionally, the DWP architecture enables a user to define reusable templates that enable a user to provide user-specific parameters to the data warehouse program via a business view. The templates can be used by several users and business views simultaneously.

Moreover, the DWP architecture is supported by a flexible and intuitive parameter system in which commonly used parameters, called tokens, can be included by, for example, selecting them from a list, thereby avoiding both error prone typing and confusion by users as to how to access these system parameters.

This DWP architecture supports the creation of various business views of data by allowing the use and reuse of readily available data warehouse programs which can be accessed, created and used by many users. This DWP architecture also provides a clean, intuitive and reliable method of parameter communication for use with data warehouse programs.

Hardware Environment

Figure 1:
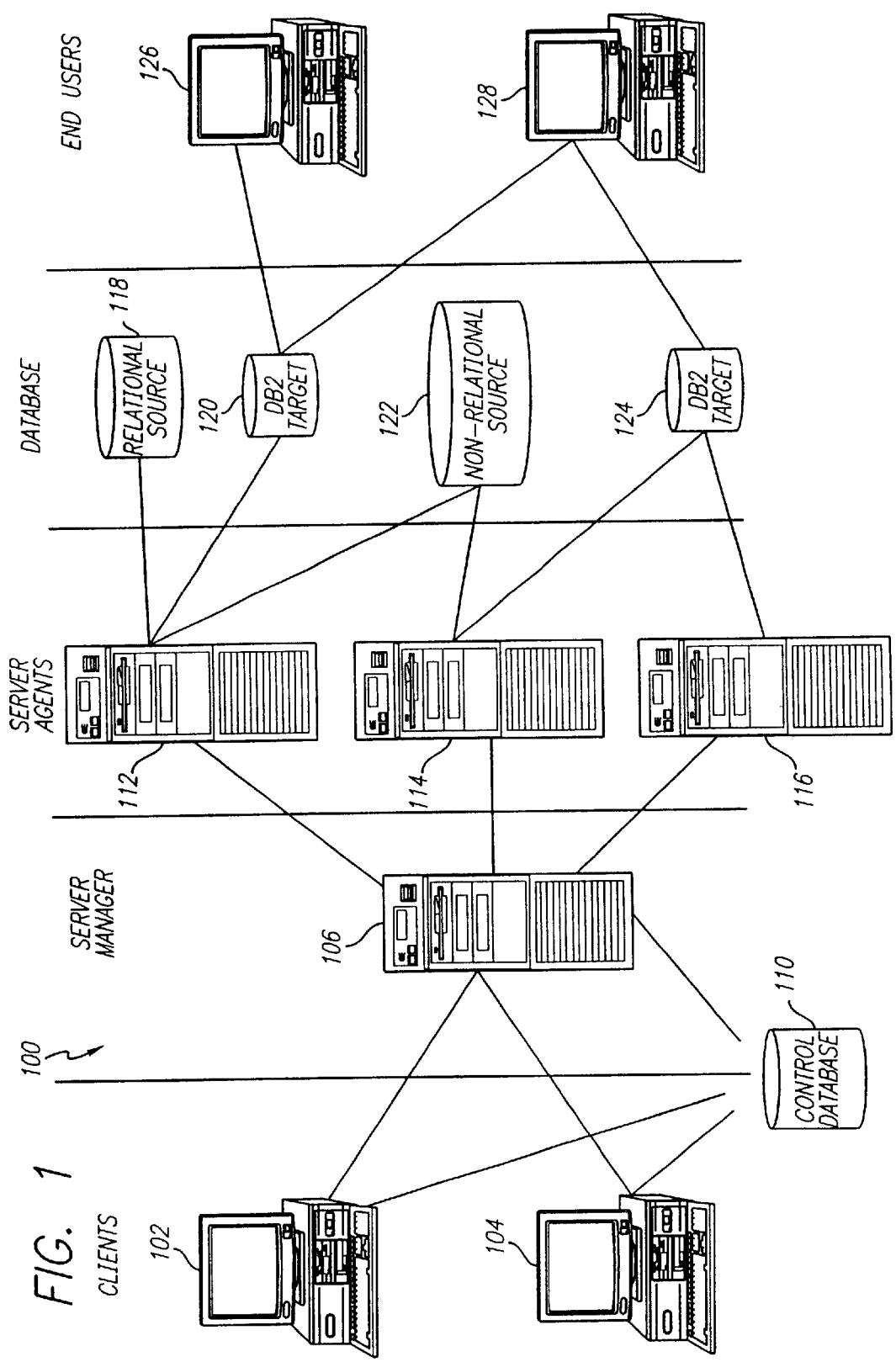
FIG. 1 is a block diagram illustrating an exemplary hardware environment used to implement the preferred embodiment of the present invention.

FIG. 1 is a block diagram illustrating an exemplary hardware environment used to implement the preferred embodiment of the present invention. In the exemplary hardware environment, a client/server architecture is illustrated comprising a scalable data warehouse architecture 100 for, for example, a data warehouse. The scalable data warehouse architecture 100 has a two-tier server architecture.

Those skilled in the art will recognize that any combination of the above components, or any number of different components, peripherals, and other devices, may be used with the computers 102 and 104. Those skilled in the art will also recognize that the present invention may be implemented on a single computer, rather than multiple computers networked together, or may consist of networks linked together through various means.

The present invention is typically implemented using one or more computer programs, each of which executes under the control of an operating system, such as OS/2™, Windows™, DOS™, AIX™, UNIX™, MVS™, and so forth, and causes the computers 100 and 102 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the computers 100 and 102, cause the computers 100 and 102 to perform the steps necessary to implement and/or use the present invention. Under control of the operating system, the computer programs may be loaded from the memory, data storage devices, and/or data communications devices into the memories of the computers 100 and 102 for use during actual operations. Those skilled in the art will recognize many modifications may be made to this configuration without departing from the scope of the present invention.

In the example illustrated in FIG. 1, the present invention includes data warehouse client computers 102 and 104 having, inter alia, monitors and data storage devices are connected to a control database 110. The client computers 102 and 104 communicate with the first tier of server computers 106 to request processing of a query. Execution of the query transfers data from a source database 118 and 122 to a target database 120 and 124. End user computers 126 and 128 are connected to the target databases 120 and 124, which enables users to perform data analysis at the end user computers 126 and 128.

The first tier of server computers comprises a server computer 106 connected to a control database 110. This server computer 106 is a server manager computer for interfacing with client computers 102 and 104 and exercising control over the second tier of server computers 112, 114, and 116. The server manager computer 106 receives a query from a client computer 102 or 104. The server manager computer 106 schedules the processing of the query and stores the query in the control database 110 for later forwarding to an server agent computer 112, 114, or 116 for execution of the query.

The second tier of server computers 112, 114, and 116 are server agent computers for transferring data between data sources 118 and 122 and data targets 120 and 124. The server manager computer 106 preferably communicates with the server agent computers 112, 114, and 116 via Transmission Control Protocol/Internet Protocol (TCP/IP). The server agent computers 112, 114, and 116 preferably communicate with databases 118, 120, 122, and 124 via Open Database Connectivity (ODBC). Once an server agent computer 112, 114, or 116 has executed a query, the server agent computer 112, 114, or 116 reports the results to the server manager computer 106. The server manager computer 106 stores the results in the control database 110. The client computers 102 and 104 can access the results in the control database 110. The second tier is scalable and is comprised of server agent computers 112, 114, and 116 for transferring data between data sources 118 and 122 and data targets 120 and 124.

Data is accessed through the server agent computers 112, 114, and 116. In particular, not every server agent computer 112, 114, and 116 is connected to every database. Instead, server agent computers 112, 114, and 116 are connected to pairs of data sources 118 and 122 and data targets 120 and 124. The server manager computer 106 schedules queries for execution by an server agent computer 112, 114, or 116 based upon availability of the server agent computers 112, 114, and 116 and based upon the data sources 118 and 122 and data targets 120 and 124 connected to particular server agent computers 112, 114, and 116. Data transfers are therefore limited to those between a data source 118 and 122 and a data target 120 and 124 connected to a common server agent computer 112, 114, or 116.

One of the advantages of this technique is that it integrates the processes used at the different server agent computers 112, 114, and 116. The server agent computers 112, 114, and 116 are independent computers in that each can use its own computer programs, operating system, hardware platforms, and data sources and data targets. Yet, the control database 110 allows for central control and documentation of both the structure of the warehouse and the currency of the data.

In the exemplary hardware environment, the client computers 102 and 104 and the server computers 106, 112, 114, and 116 may each include, inter alia, a processor, memory, keyboard, or display, and may be connected locally or remotely to fixed and/or removable data storage devices and/or data communications devices. Each of the computers 102, 104, 106, 112, 114, and 116 could also be connected to other computer systems via the data communications devices. Those skilled in the art will recognize that any combination of the above components, or any number of different components, peripherals, and other devices, may be used with the computers 102, 104, 106, 112, 114, and 116. Those skilled in the art will also recognize that the present invention may be implemented on a single computer, rather than multiple computers networked together.

Data Warehouse

A data warehouse, such as the Visual Warehouse™ product, provides an end to end solution for departmental data warehousing. With a data warehouse, a user can extract a wide variety of heterogeneous data, transform the data using SQL, and store the data for use in decision support. The data warehouse can enable users to explore data warehousing without building an enterprise-wide data warehouse. The data warehouse can access a variety of sources, including DB2™, Oracle™, Informix™, Sybase™, Microsoft™ SQL server, and flat files.

The data warehouse enables decision makers and analysts to become more productive. Additionally, the data warehouse can be a datamart that contains data optimized for end user decision making and data analysis. The datamart contains only the essentials for a small set of users. A datamart does not attempt to satisfy the needs of everyone in the corporation, rather it servers the specific needs of select users. A datamart enables users to: replicate data from a variety of operational data sources; aggregate, summarize, cleanse, or enhance the data; and, make the data available to end users through various decision support tools.

Moreover, the data warehouse enables users to create business views, which model the structure and format of data using an interface that is easy to understand.

In one embodiment of the invention, a data warehouse and data warehouse programs may be the Visual Warehouse™ and Visual Warehouse™ Programs, from International Business Machines, Corporation, Armonk, N.Y. However, those skilled in the art will recognize that the principles embodied in the present invention is not in any way limited to those systems and programs. The principles can be used with many other systems, such as DB2™, Oracle™, Informix™, Sybase™, or other relational or non-relational databases, and can run on computers using, for example, IBM OS/2™, Microsoft Windows NT™, IBM AIX™, Hewlett-Packard HP-UX™, Sun Solaris™, and other operating systems.

Data Warehouse Programs (DWP) Architecture

Figure 2:
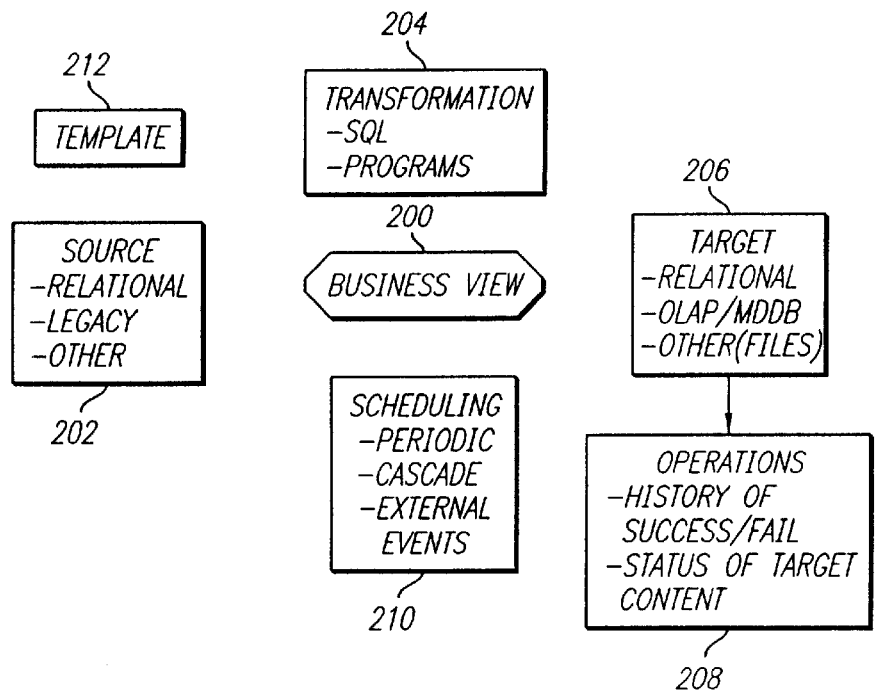
FIG. 2 is a block diagram depicting, at a high level, the basic components of the DWP architecture.

FIG. 2 is a block diagram depicting, at a high level, the basic components of the DWP architecture. A business view 200 is a software object that links components of the DWP architecture together. A business view 200 is a description of a process which takes some input from a source 202, such as tables or files, and generates output to a target 206, such as a table or file. Additionally, a business view 200 links the source and target to a transformation process 204 that "transforms" the data from the source 202 to result in data for the target. In one embodiment of the present invention, the business view 200 resides on the server manager 106. Moreover, a user at a client computer 102 or 104 can use a graphical user interface (GUI) to define the business view 200. In defining the business view 200, the user provides the sources 202, targets 206, and the transformations 204 to be invoked by the business view 200. The business view 200 is a metadata definition. Metadata is information about other data and processes.

In particular, the business view 200 contains pointers or references to sources 202 that are used by a specified transformation process 204 to generate targets 206. The source 202 can be relational data, legacy data, or other data. The target 206 can be relational data, OLAP/MDDB data, or other data (e.g., files). The Transformation process 204 can be SQL or a data warehouse program. An example of a Transformation process 204 may be a data warehouse program that loads data from a source 202 into a target 206. In one embodiment of the present invention, the data warehouse program resides on a server agent 112, 114, or 116, and the source and target data resides on databases 118, 120, 122, 124.

Transformations 204 can be two general types. The first type of transformation is an SQL query which performs a SELECT operation on the source 202 to obtain data and an INSERT operation on the Target 206 to place the selected data in the target. The second type of transformation is a program (e.g., a data warehouse program) which can extract data from a source 202, transform the data, and place the result on a target 206.

A data warehouse program can be either a system provided program (e.g., a FTP command or Load utility) or a user-defined program (i.e., the program may be created by the user). The data warehouse program uses a template definition, described below. A data warehouse program may have parameters, which are provided to the data warehouse program when it is invoked.

After the data warehouse program has been executed, the results of the execution, which indicate whether the program ran successfully and which identify problems that were encountered, are placed in the operations file 208, so that a user may later reference this information. The operations file 208 may include information on the history of success or failure of transformations and the status of target contents. The scheduling 210 is done at the server manager 106 to schedule the business view for invocation, which in turn invokes the data warehouse programs for execution at the server agents. The scheduling 210 may be periodic, may cascade, or may be dependent on external events.

The user can also define a template 212 using a graphical user interface at a client computer 102 or 104. The template 212 contains information used by the business view 200 to invoke a data warehouse program. For example, the template 212 may contain parameters for the data warehouse program and the name and location (i.e., where the data warehouse program is physically installed) of the data warehouse program that a particular business view 200 is to invoke. The template 212 provides metadata information. The template 212 contains the following information about a data warehouse program: a business name; a physical name and type of the executable file; a description; a server agent at which the data warehouse program is installed with this physical name; and, a list of parameters. If the data warehouse program is installed on several server agents with the same physical name, one definition is enough, with links to all corresponding server agent, and, if the physical name is different (e.g., the file is in a different directory), a new definition is required. Each parameter contains a short description and a default value.

The template 212 can also include tokens for the parameters. Tokens are variables which are replaced at the time of execution. The DWP architecture supports different types of tokens. The tokens can represent, for example, date and time, input/output (I/O) definitions, and runtime information. The date and time tokens are replaced by the date and time at which the Business view is scheduled, and the date and time tokens may contain the data in different formats (e.g., mm/dd/yy, quarters, date of week). The I/O definitions, include table names, user identifications ("userids"), and passwords associated with a resource defined in the DWP architecture). The runtime information is used for post-processing and may include return codes and row counts. When the template 212 is processed, if a token is found, the token is replaced with the appropriate information (e.g., date or time). That is, tokens allow for dynamic parameter replacements. In this manner, the DWP architecture enables users to avoid retyping information in separate templates and prevents user input errors. The template 212 can be used by multiple users and by different business views 200. In one embodiment of the invention, the template 212 resides on the control database 110.

To use the DWP architecture, a user initially defines a business view 200 and defines a template 212. A user can then invoke the business view 200. The business view 200 initializes the parameters to be forwarded to the data warehouse program with the parameters in the template 212. The business view 200 always invokes a particular data warehouse program with the same parameters. Then, the business View 200 invokes the data warehouse program at the server agent 112, 114, 116 to transform 204 data at the source 202 and generate data at the target 206. The server agent 112, 114, 116 may store information about the execution of the data warehouse program in an operations file 208 at the server agent 112, 114, 116 and/or may forward this information to the server manager 106, at which the business view 200 resides.

Simply put, a user defines a business view to identify certain sources, certain transformations, and certain targets. The transformations take data from the sources, transform the data,, place the data on the targets listed, according to the schedule given (stored on the control database), and place the status of the transformation on the operations (i.e., history) area of the control database.

In one embodiment of the invention, the server manager 106 schedules the business view 200 and sends a message to the server agent specified in the business view 200, on which the data warehouse program resides. The server manager 106 then sends a message to the server agent 112, 114, 116 with the physical name of the data warehouse program, its type, and a string copy of the parameter list in which the tokens have been replaced by their vales. The server agent 112, 114, 116 issues a system call, depending on the type of the data warehouse program, to start the data warehouse program with the appropriate parameters.

In one embodiment, the data warehouse program is an instance of a data warehouse program template. That is it is a program that is copied from a data warehouse program template and has certain parameters passed to it from the business view. The data warehouse program may also have certain parameters called tokens. Tokens are merely system parameters that are replaced at execution time. There are several types of tokens supported by the data warehouse programs architecture. They include: date and time, input and output definitions, and runtime information.

Graphical User Interfaces and Flow Diagrams

The following discussion will provide further detail about the DWP architecture using graphical user interface and flow diagram descriptions.

Figure 3:
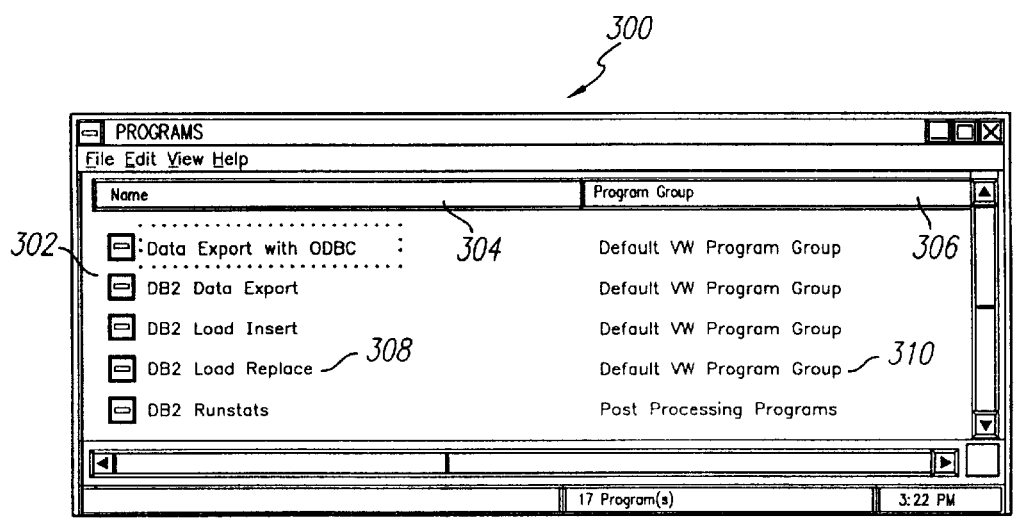
FIG. 3 illustrates a window displaying a list of available templates.

FIG. 3 illustrates a window 300 displaying a list of available templates 302. The list of templates 302 identifies the name 304 of the template and the program group 306 to which the template belongs. One of the templates is "DB2 Load Replace" 308, which is in the "Default VW Program Group" 310. A user can select a template for editing. For example, if a user selects the template "DB2 Load Replace" 308, then the window illustrated in FIG. 4 may be displayed.

Figure 4:
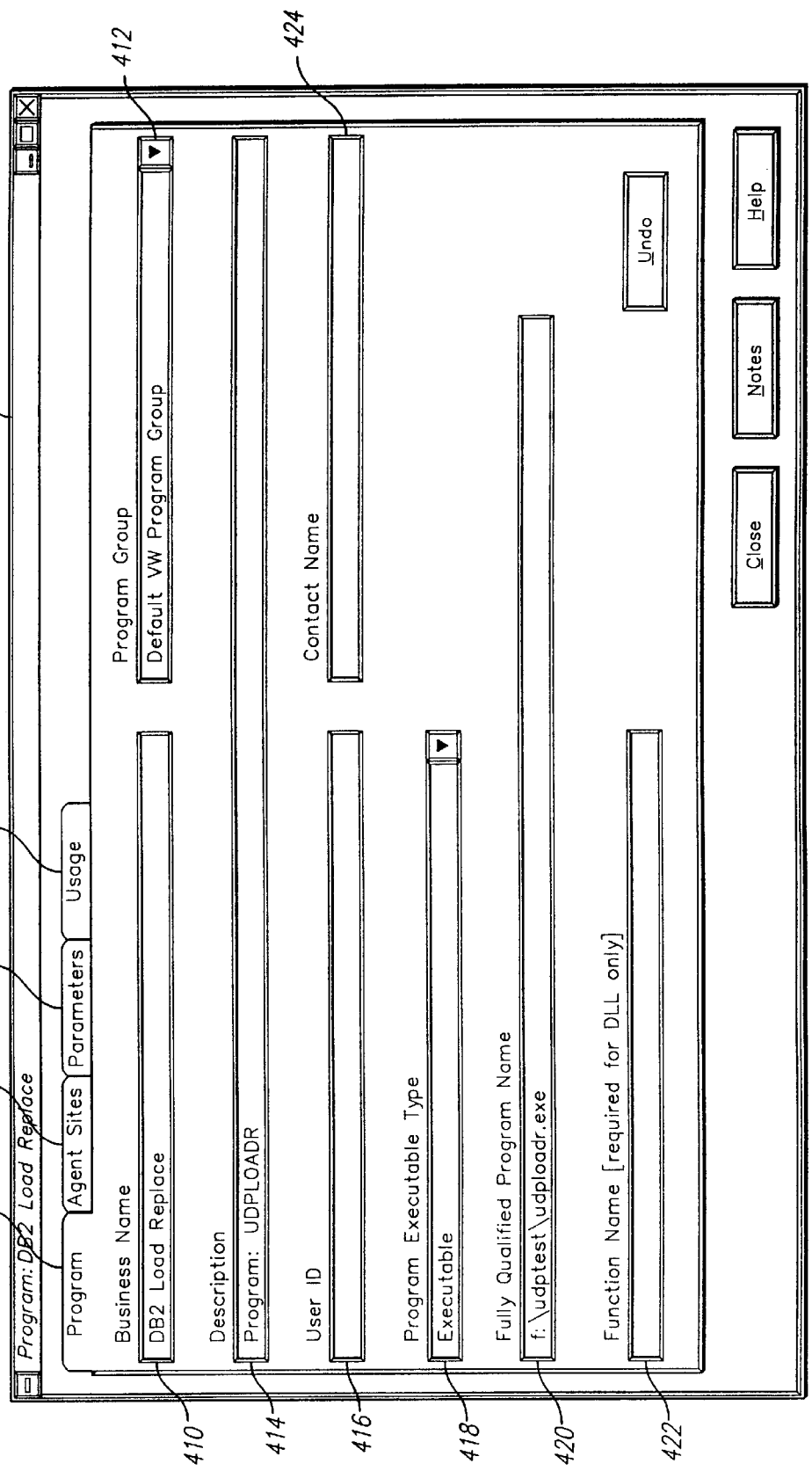
FIG. 4 illustrates a window for use in editing a template with a programs tab selected.

FIGS. 4–9 illustrate the different graphical user interfaces that may be provided to the user to enable the user to edit the selected template from FIG. 3. FIG. 4 illustrates a window 400 with four tabs: a programs tab 402, an agent sites tab 404, a parameters tab 406, and a usage tab 408. In FIG. 4, the programs tab 402 has been selected, as indicated by the visual display of the programs tab 402 as being placed "on top of" the other tabs. The programs tab 402 provides a business name 410 ("DB2 Load Replace) and a program group 412 ("Default VW Program Group"), which correspond with the template selected from FIG. 3. The programs tab 402 also provides the following information: a description 414 ("Program: UPLOADR"), a user identifier 416, a program execution type 418 ("Executable"), a fully qualified program name 420 ("f:\udptest\udploadr.exe"), a name 422, and a contact name 424.

Figure 5:
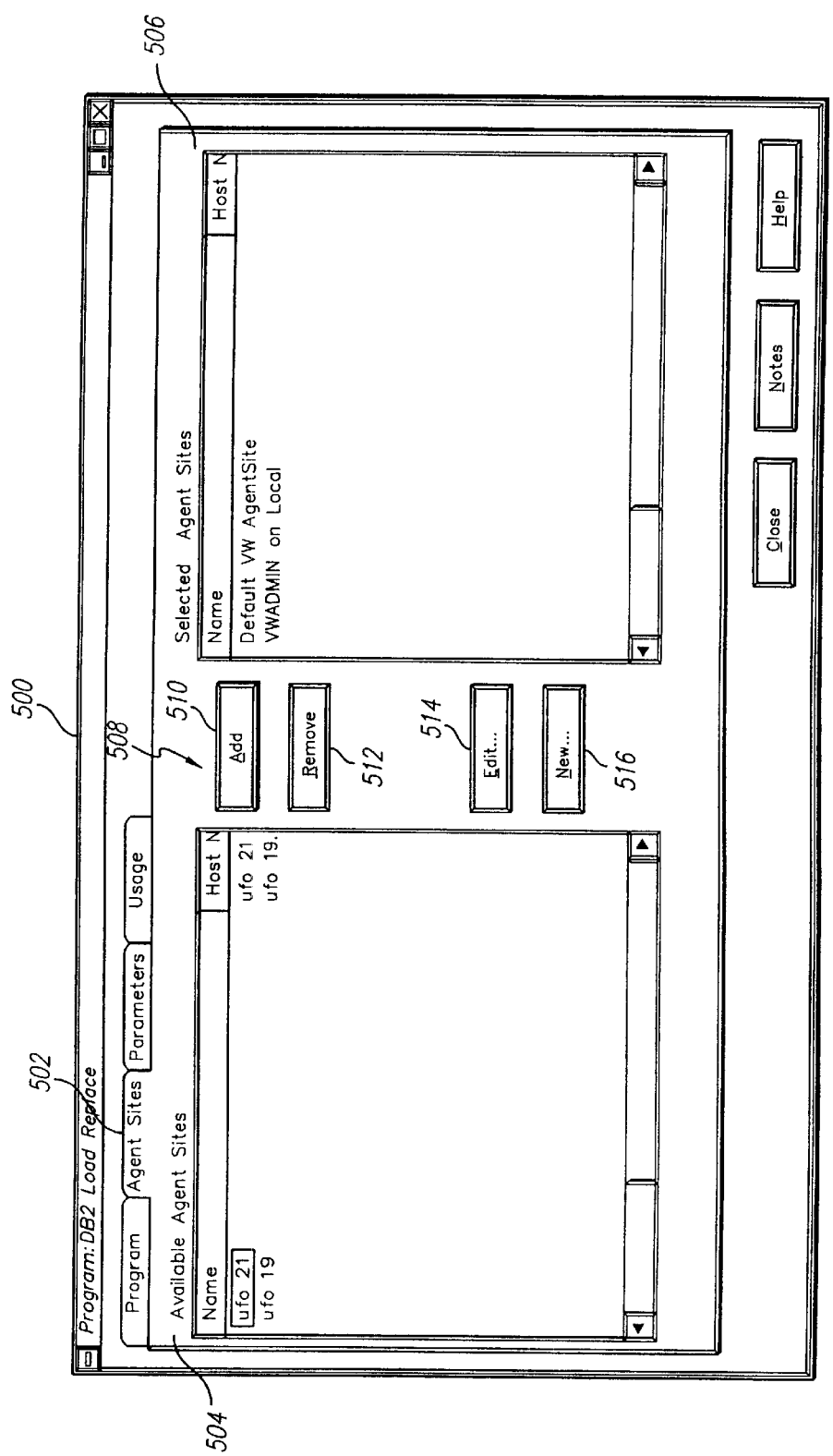
FIG. 5 illustrates a window in which an agent sites tab has been selected.

FIG. 5 illustrates a window 500 in which an agent sites tab 502 has been selected. When the agent sites tab 502 is selected, the available agent sites 504 are listed, along with the selected agent sites 506. Controls 508, including an "Add" button 510, a "Remove" button 512, a button 514, and a "New" button 516 are provided to enable a user to modify the available agent sites 504 and the selected agent sites 506 lists.

Figure 6:
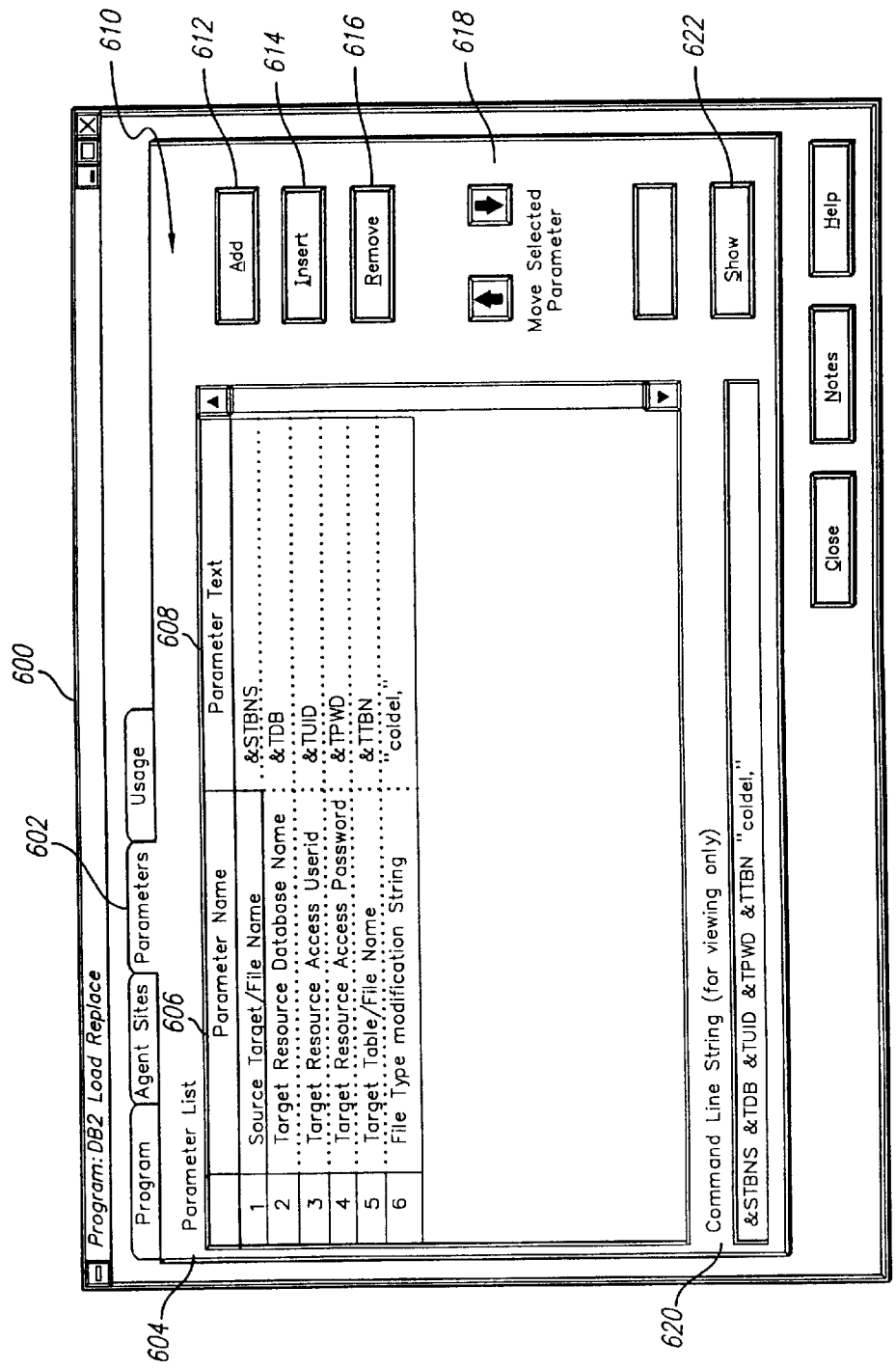
FIG. 6 illustrates a window 600 in which the parameters tab has been selected.

FIG. 6 illustrates a window 600 in which the parameters tab 602 has been selected. When the parameters tab 602 is selected, a parameter list 604 is displayed. The parameters list 604 provides a parameter name 606 and parameter text 600. Controls 610, including an "Add" button 612, and "Insert" button 614, and a "Remove" button 616, are provided to enable a user to modify the parameters list 604. Also, arrows 618 allow movement of selected parameters. A command line string 620 is provided and a "Show" button 622.

Figure 7:
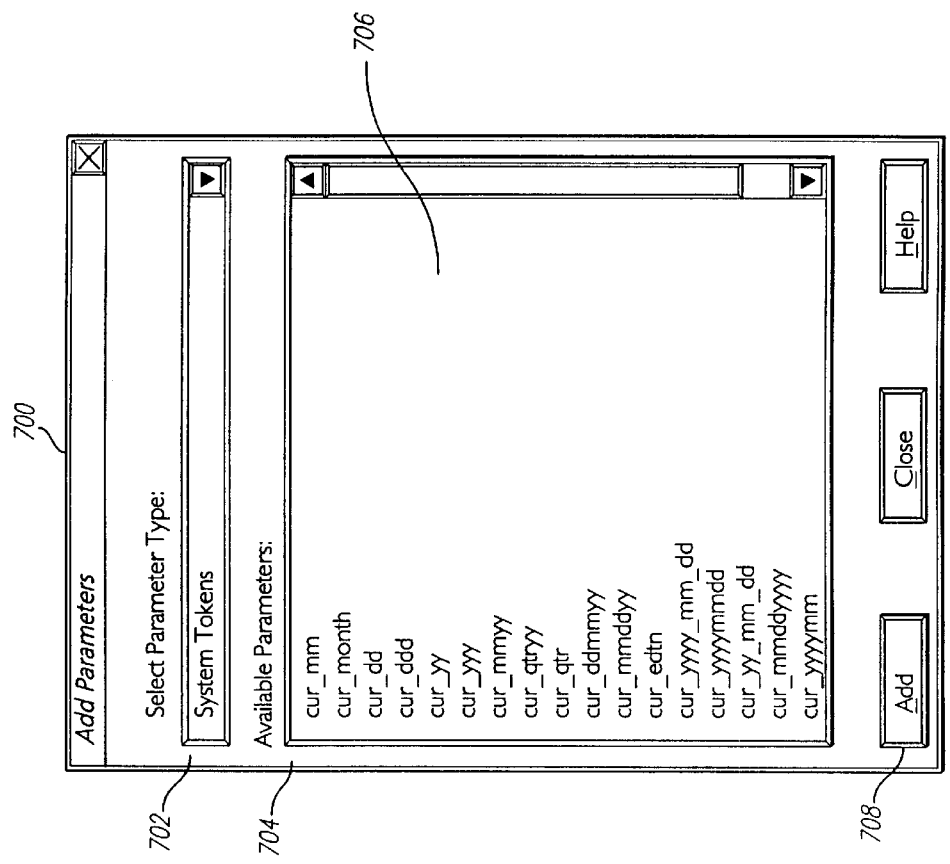
FIG. 7 illustrates a window 700 with a list of system tokens.
Figure 8:
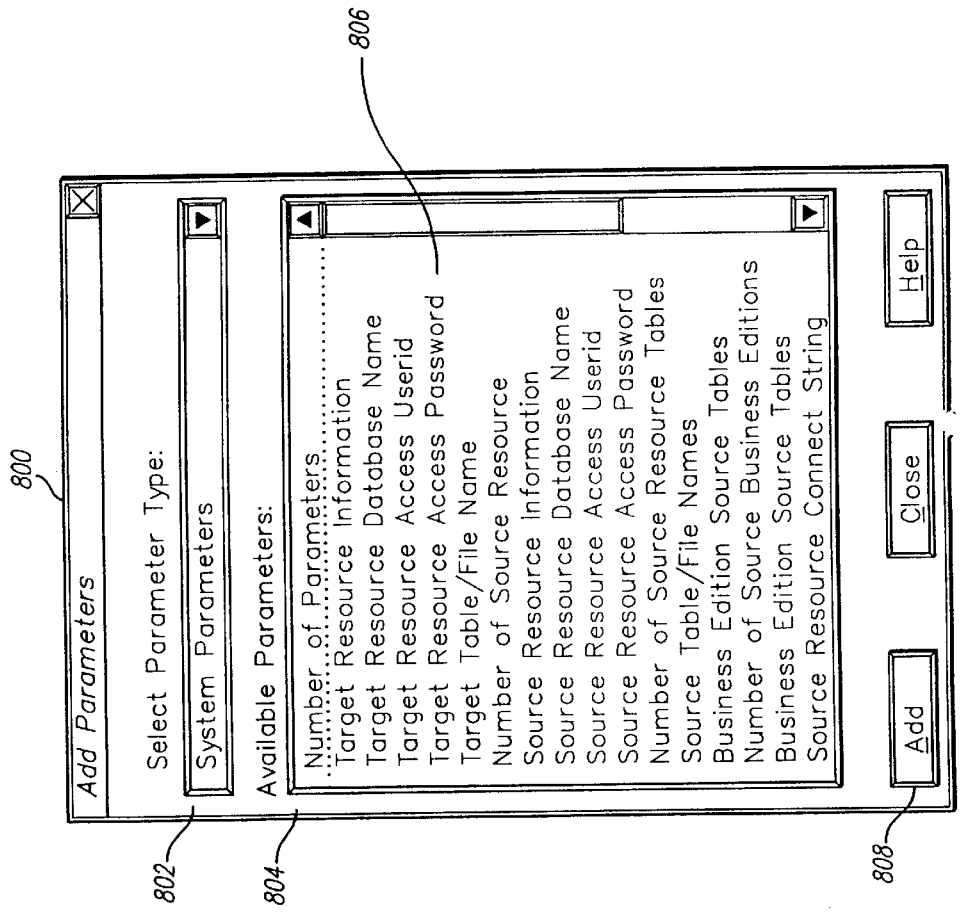
FIG. 8 illustrates a window 800 with a list of system parameters.

If the "Add" button 612 of FIG. 6 is selected, then the system tokens and system parameters may be displayed, as shown in FIGS. 7 and 8. FIG. 7 illustrates a window 700 with a list of system tokens. The Select Parameters field 702 contains "System tokens". Therefore, the Available Parameters field 704 provides a list of system tokens 706. Controls 708 enable a user to select system tokens.

When the Select Parameters field 702 is modified to contain "System Parameters", the window 800 of FIG. 8 is displayed. FIG. 8 illustrates a window 800 with a list of system parameters. The Available Parameters field 804 provides a list of system parameters 806. Controls 808 enable a user to select system parameters.

Figure 9:
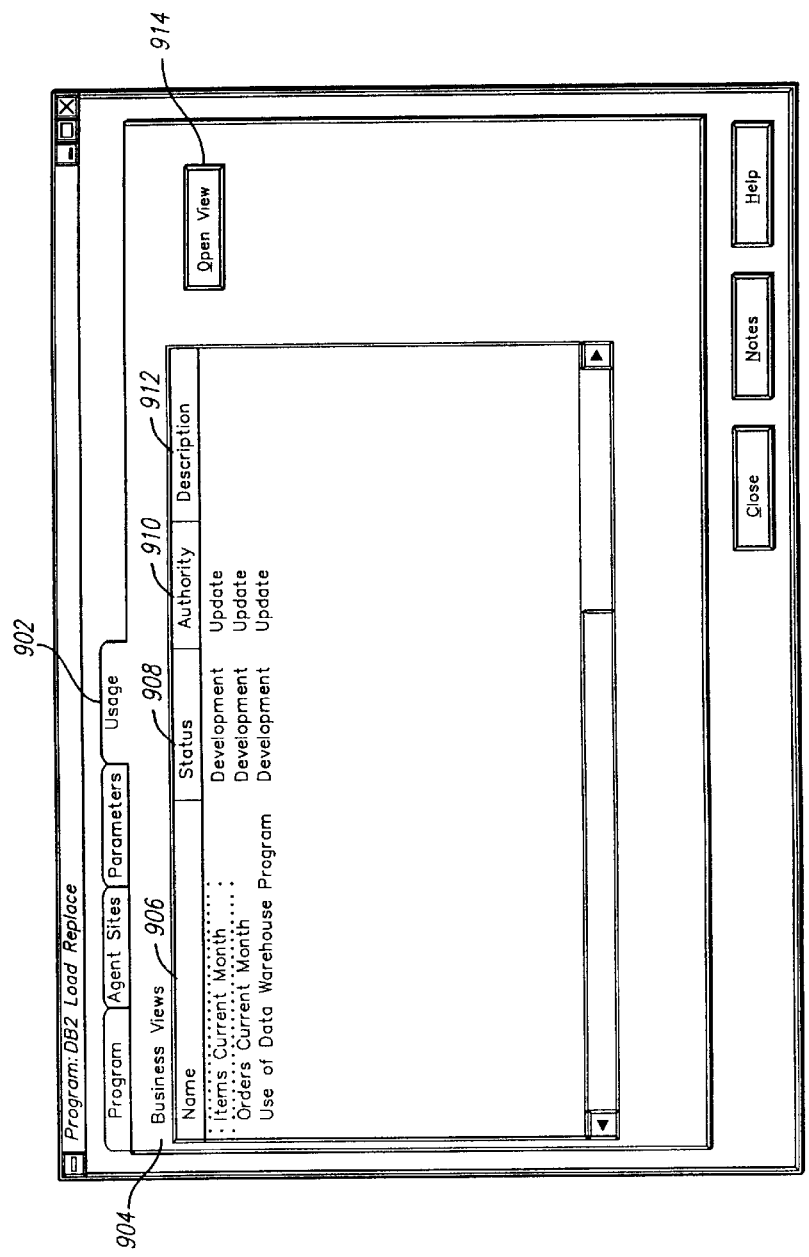
FIG. 9 illustrates a window in which the usage tab has been selected.

FIG. 9 illustrates a window 900 in which the usage tab 902 has been selected. Business Views 904 are listed with a name 906, a status 908, an authority 910, and a description 912. An "Open New" button 914 enables opening a new business view.

Figure 10:
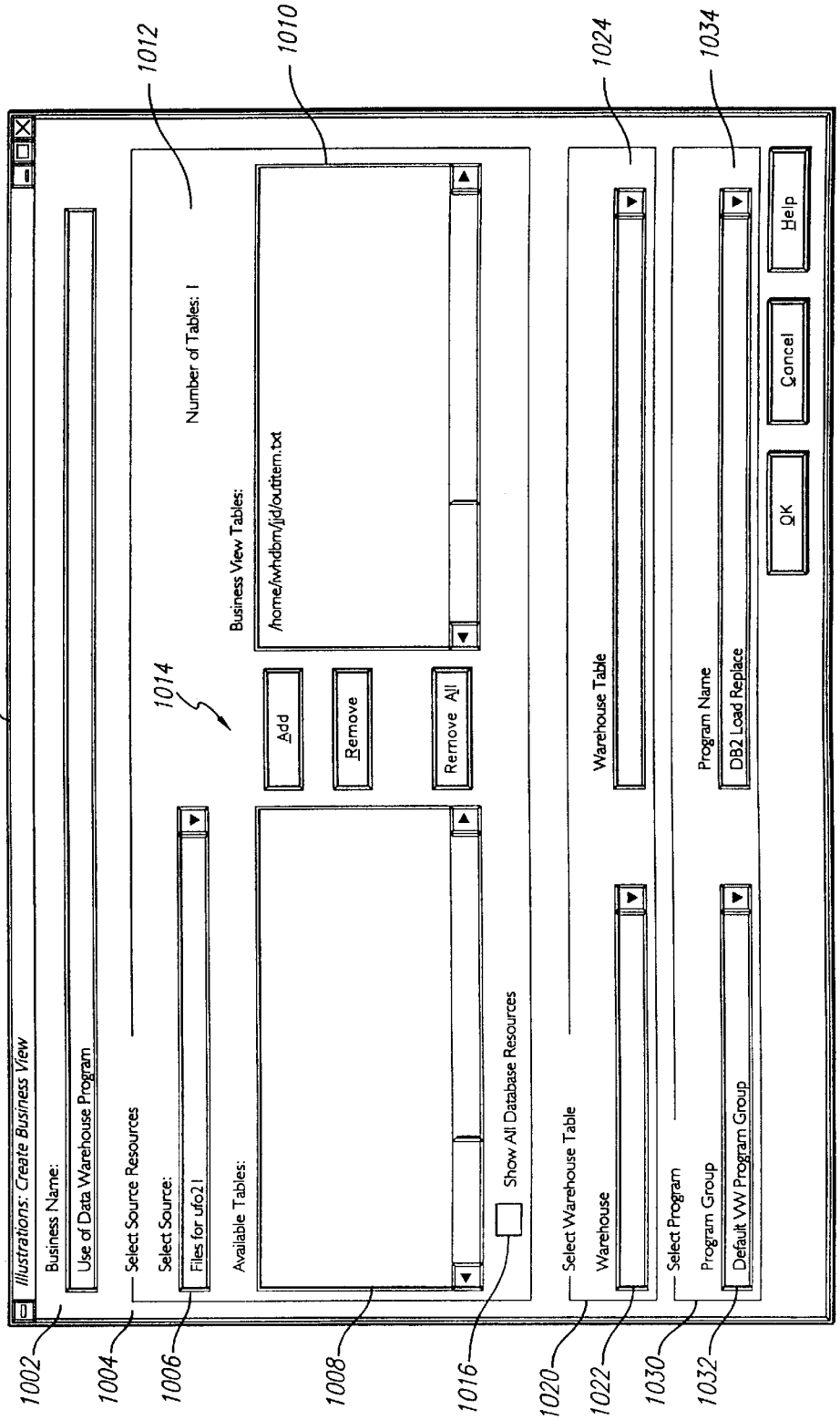
FIG. 10 illustrates a window for defining a business view.
Figure 11:
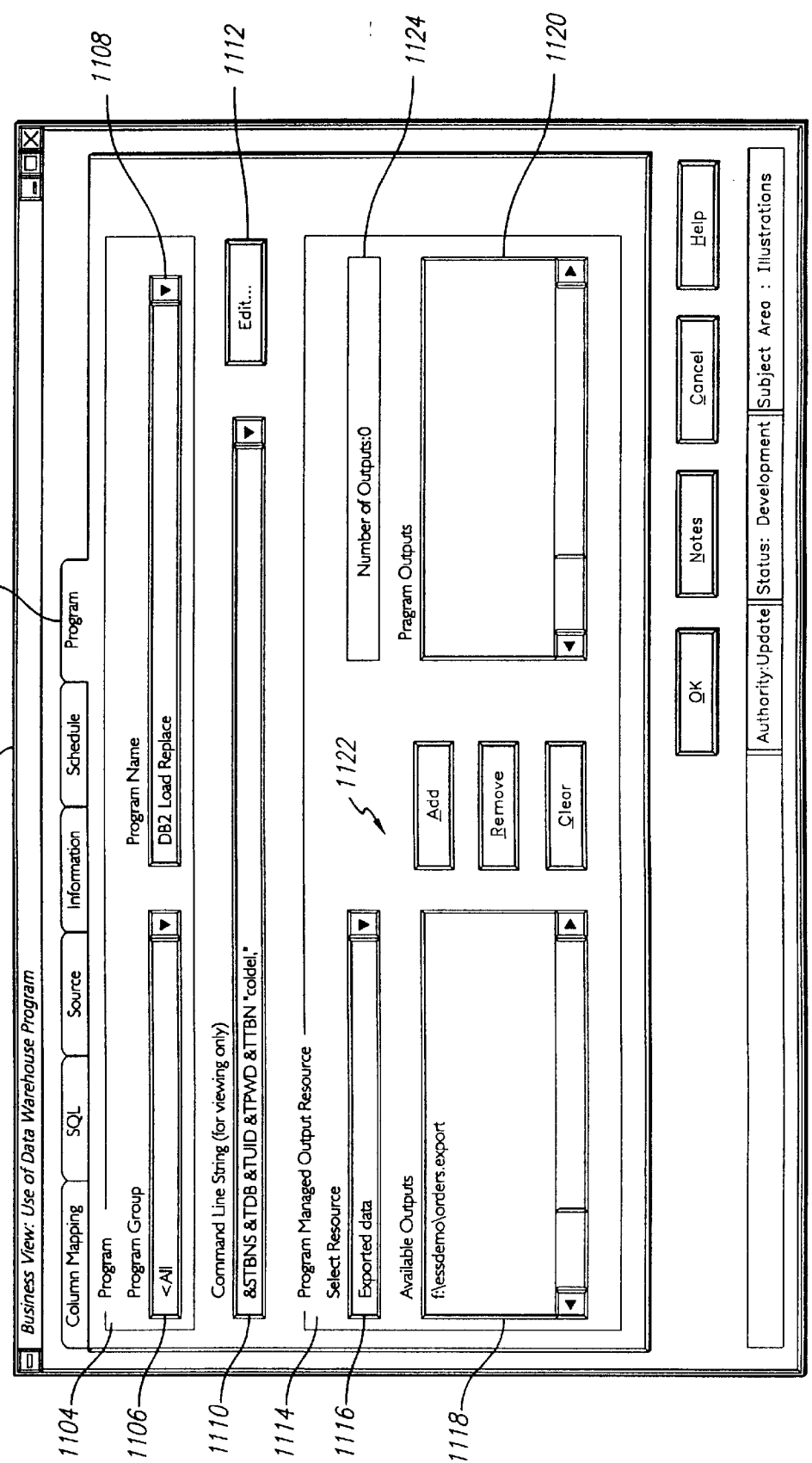
FIG. 11 illustrates a window that illustrates the defined business view and enables a user to edit the business view.
Figure 12:
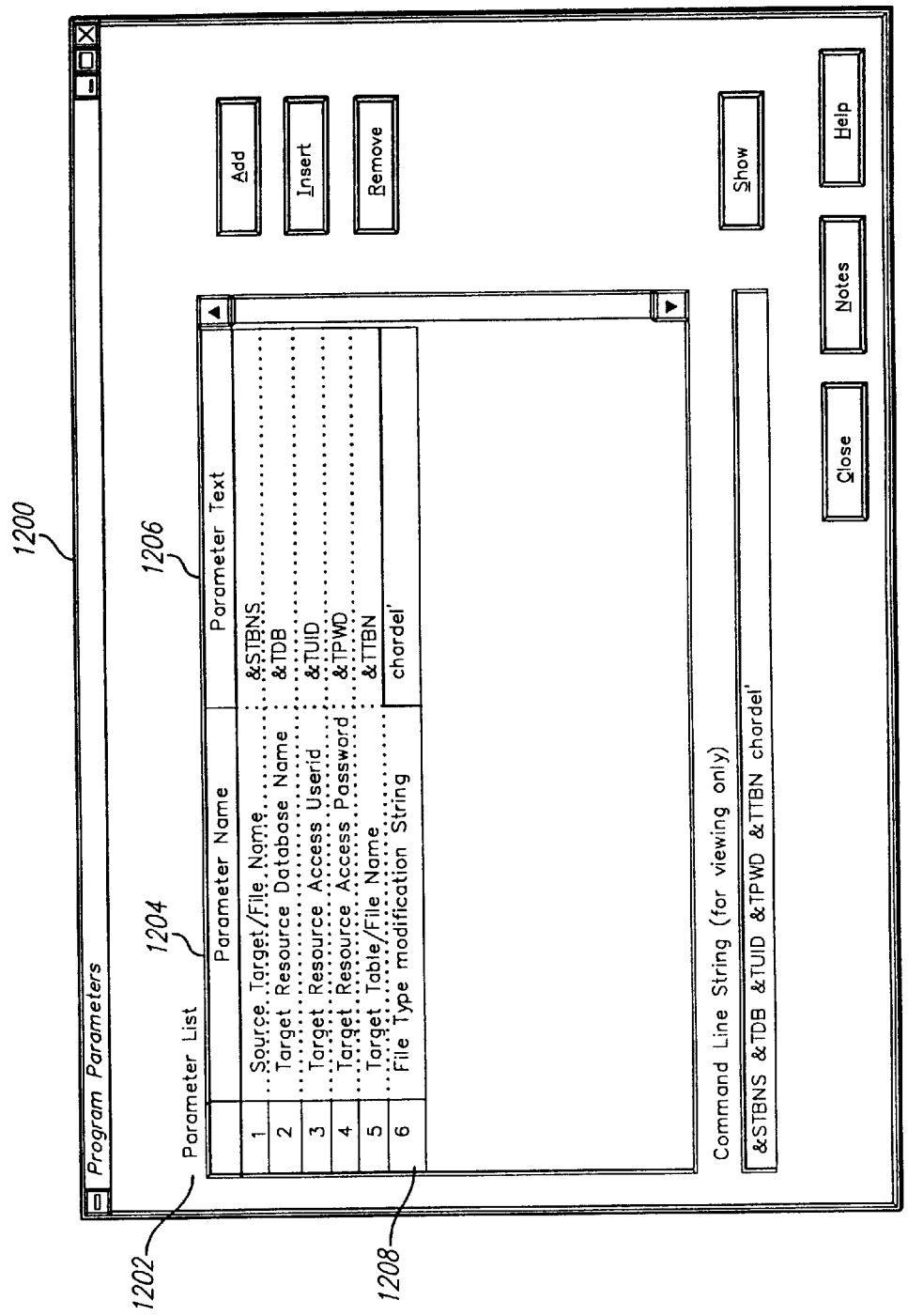
FIG. 12 illustrates a window 1200 that enables a user to edit parameters.

Once a template has been defined using the graphical user interfaces of FIGS. 4–9, a user may use the graphical user interfaces shown in FIGS. 10–12 to define and use a business view using the template that was defined.

FIG. 10 illustrates a window 1000 for defining a business view. The window 1000 includes a business name 1002 ("Use of Data Warehouse Program") and a Select Source Resources area 1004. The Select Source Resources area 1004 includes: a Select Source field 1006, Available Tables 1008, Business View Tables 1010, and Number of Tables 1012. Controls 1014 include an "Add" button, a "Remove" button, and a "Remove all" button. Also, a Show All Database Resources checkbox 1016 is provided. A Select Warehouse Table area 1020 includes a Warehouse field 1022 and a Warehouse Table field 1024. A Select Program area 1030 includes a Program Group field 1032 and a Program Name field 1034.

FIG. 11 illustrates a window 1100 that illustrates the defined business view and enables a user to edit the business view. The window 1100 has several tabs, including a program tab 1102. The program tab 1102 includes a Program Area 1104 with a Program Group field 1106 and a Program Name field 1108. A Command Line String field 1110 has an associated "Edit" button 1112. A Program Manager Resources area 1114 has a Select Resources field 1116, an Available Tables list 1118, a Program Tables list 1120 and controls 1122.

When the "Edit" button 1112 is selected, a user is provided with the graphical user interface illustrated in FIG. 12 for editing the parameters in the Command Line String 1110 of FIG. 11. FIG. 12 illustrates a window 1200 that enables a user to edit parameters. The window 1200 provides a parameter list 1202 with parameter names 1204 and parameter text 1206. As illustrated in FIG. 11 above, the Command Line String 1110 included a parameter of "coldel". However, a user has edited this parameter 1208 to be "chardel".

The power of the DWP architecture lies in several features. The first is that templates are defined and placed on the control data base. From there they can be accessed by any number of data warehouse programs. Several business views can run different instances of the same template simultaneously. The templates also can be tailored to the individual business using parameters and tokens. The tokens are a type of parameter and are indicated within a template by preceding the token with a &, e.g. &date-time. These tokens are conveniently predefined for the user, who constructs the template, and may be selected by the user from a list of tokens. This avoids the errors that could occur from different users each having to type the parameter values.

Figure 13:
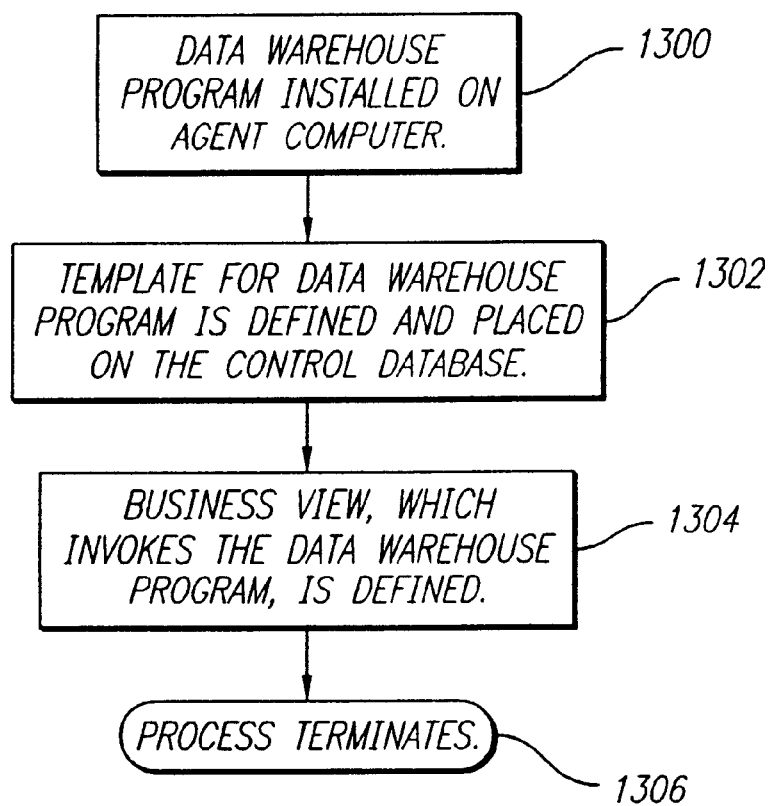
FIG. 13 is a flow diagram of the process of defining the components for the DWP architecture.

FIG. 13 is a flow diagram of the process of defining the components for the DWP architecture. The process is begun in Block 1300 when the data warehouse program is installed on the server agent. Control then passes to Block 1302 where the template is defined and placed on the control database. Control then passes to Block 1304 where the business view is defined which calls the data warehouse program. The business view will provide links to the source target and data warehouse programs which will take data from the source, transform the data, and place the data on the target. Control then passes to Block 1306 where the process terminates.

Figure 14:
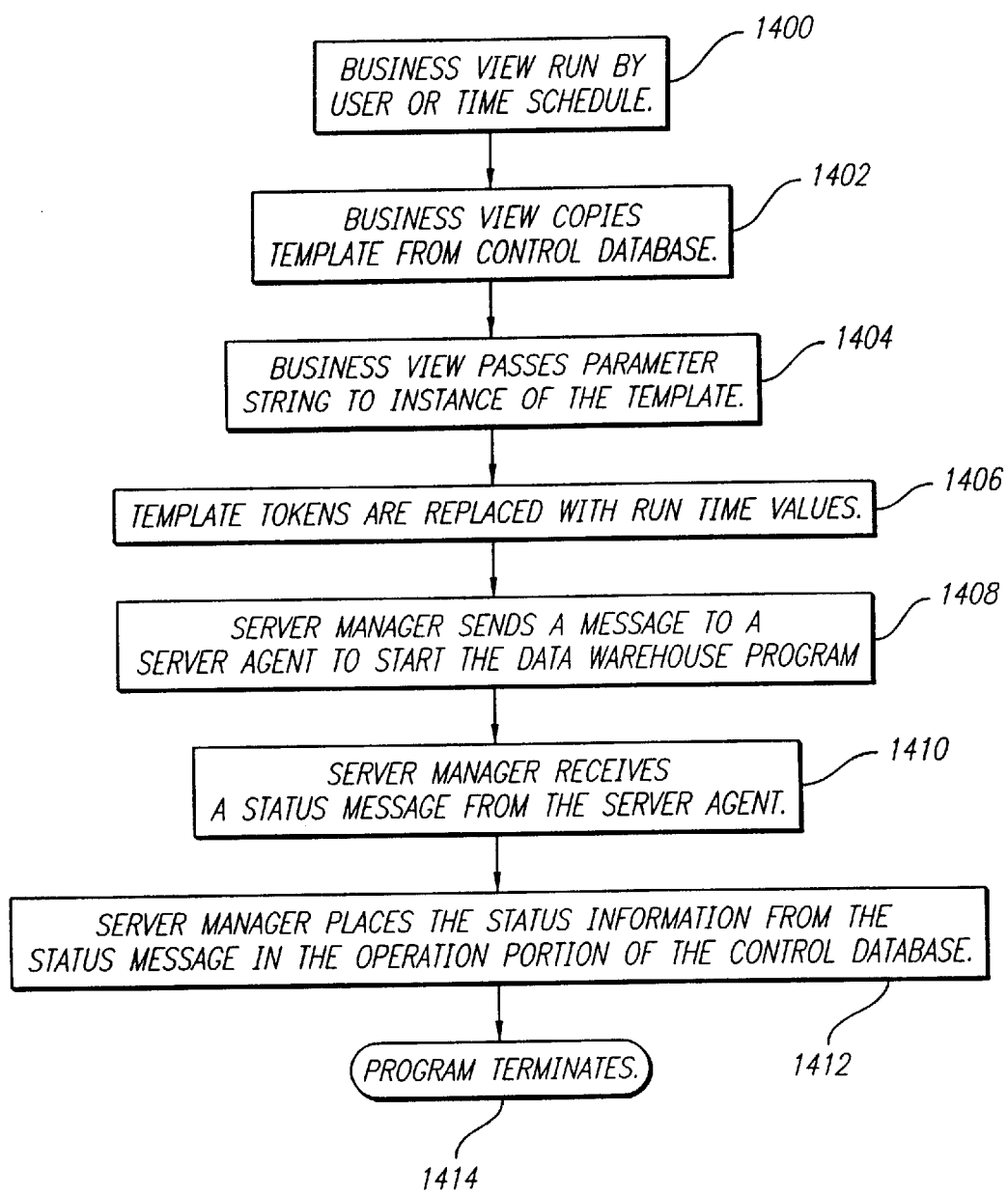
FIG. 14 is a flow diagram of the steps performed at the server manager within the DWP architecture.

FIG. 14 is a flow diagram of the steps performed at the server manager within the DWP architecture. In Block 1400, a business view is run by a user command or from a schedule at a predefined time. Control then passes to Block 1402 where the business view copies the appropriate template from the control database, creating an instance of the template. Control then passes to Block 1404 where the business view passes the parameter string to the instance of the template. The parameters in the template will replace the default parameters contained in the parameter string. Control then passes to Block 1406 where the template tokens are replaced by run time values. Control then passes to Block 1408 and the server manager sends a message to a server agent to start a data warehouse program. Control then passes to Block 1410 in which the server manager receives a status message from the server agent, after the server agent has run the data warehouse program. Control then passes to Block 1412 in which the server manager places the status information from the status message in the operation portion of the control database. Control then passes to Block 1414 and the process terminates.

Figure 15:
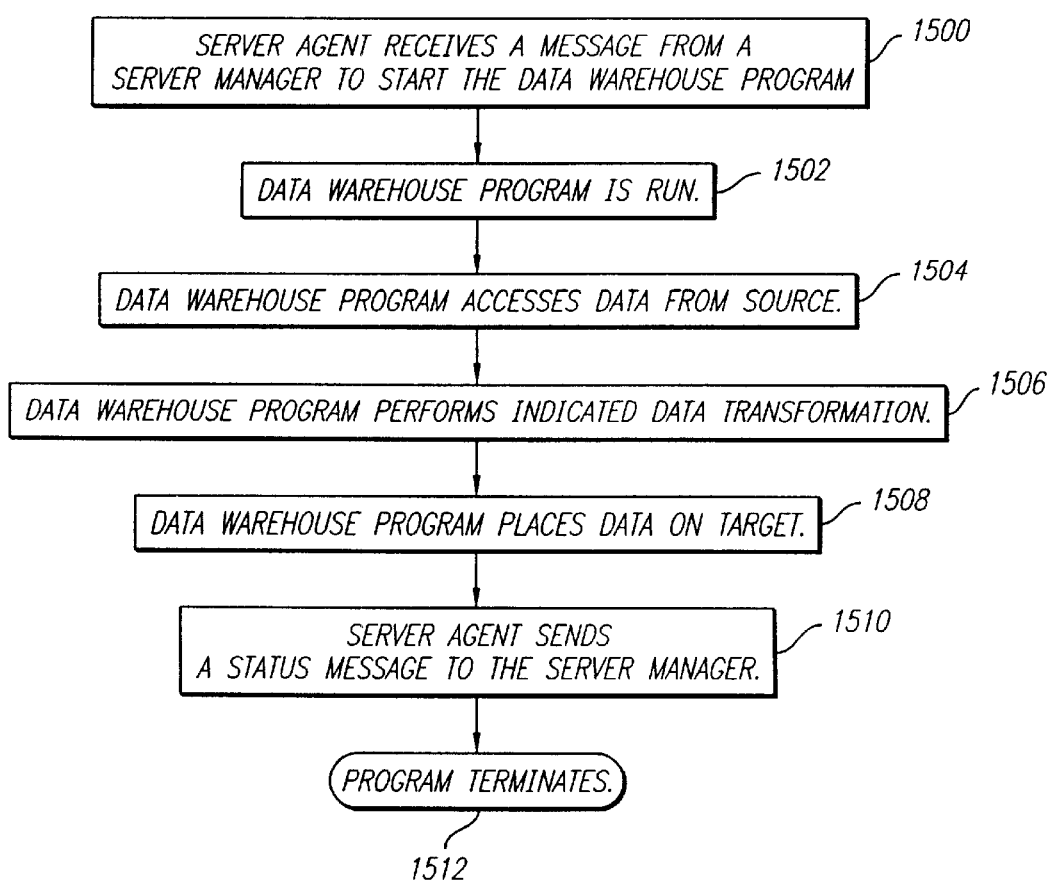
FIG. 15 is a flow diagram of the steps performed at the server agent within the DWP architecture.

FIG. 15 is a flow diagram of the steps performed at the server agent within the DWP architecture. In Block 1500, the server agent receives a message from the server manager to start the data warehouse program. Control then passes to Block 1502 in which the data warehouse program is run. Control then passes to Block 1504 where the data warehouse program accesses data from a source. Control then passes to Block 1506 where the data warehouse program performs the indicated data transformation. Control then passes to Block 1508 where the data warehouse program places data on the target. Control then passes to Block 1510 where the server agent sends a status message to the server manager. Control then passes to block 1512 where the program terminates.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The embodiment has also been illustrated in most instances by using the example of a single data warehouse program using a single source file, target file, transform and so forth. Those skilled in the art will recognize that any number of data warehouse sources, targets, etc. may be combined in a virtually infinite variety of ways and that many levels of indirection, such as calling data warehouse programs from other data warehouse programs are possible.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be defined by this detailed description, but rather by the claims appended hereto.

What is claimed is:

1. A method of transforming data in a database stored on a data storage device, comprising:

defining a program template containing default parameter values corresponding to parameters of a pre-existing transformation program;

defining at least one business view having an association with the program template, said business view including scheduling information and a parameter string initialized to the default parameter values;

creating at least one scheduled instance of operation of the transformation program by receiving selective modifications of the parameter string and the scheduling information of the at least one business view from the user; and invoking the at least one scheduled instance of operation of the transformation program under control of the at least one business view.

2. The method of claim 1, wherein the program template contains tokens, which are replaced by system data at the time the transformation program is invoked.

3. The method of claim 1, wherein the transformation program is a command.

4. The method of claim 1, wherein the transformation program is a utility.

5. The method of claim 1, wherein the business view is invoked based on a predefined schedule.

6. The method of claim 1, wherein the program template comprises information about the transformation program.

7. The method of claim 1, wherein the source is identified in the business view.

8. The method of claim 1, wherein the transformation program is identified in the business view.

9. The method of claim 1, wherein the target is identified in the business view.

10. The method of claim 1, wherein the source is identified in the program template.

11. The method of claim 1, wherein the target is identified in the program template.

12. The method of claim 1, wherein the transformation program is identified in the program template.

13. The method of claim 1, further comprising the step of storing results of the invocation of the transformation program in a history file.

14. The method of transforming data in a database stored on a data storage device as set forth in claim 1, wherein the creating of at least one scheduled instance of operation of the transformation program includes:

displaying the parameter values of the parameter string;

receiving modifications of the displayed parameter values from the user; and updating the parameter string based on the received selective modifications.

15. The method of transforming data in a database stored on a data storage device as set forth in claim 1, wherein the defining of said program template includes:

defining a program template using a graphical user interface.

16. The method of transforming data in a database stored on a data storage device as set forth in claim 1, wherein:

the defining of said program template containing default parameter values corresponding to parameters of a pre-existing transformation program includes defining at least one default parameter value as a token; and the invoking of the at least one scheduled instance of operation of the transformation program under control of the at least one business view includes replacing the token with a system data value corresponding to the token.

17. The method of transforming data in a database stored on a data storage device as set forth in claim 1, wherein the defining of said program template containing default parameter values corresponding to parameters of a pre-existing transformation program includes:

defining a program template for a pre-existing transformation program, said pre-existing transformation program being one of an SQL query and a data warehouse program.

18. The method of transforming data in a database stored on a data storage device as set forth in claim 1, wherein the defining of said program template includes:

storing metadata relating to the pre-existing transformation program in the program template.

19. The method of transforming data in a database stored on a data storage device as set forth in claim 18, wherein the storing of metadata relating to the pre-existing transformation program in the program template includes:

storing at least one of a business name, a physical name, an executable file type, a description, and a server agent at which the data warehouse program is installed with a specified physical name.

20. The method of transforming data in a database stored on a data storage device as set forth in claim 1, wherein the defining of said program template containing default parameter values corresponding to parameters of a pre-existing transformation program includes:

defining a program template containing default parameter values specifying default source and target parameter values relating to the pre-existing transformation program.

21. The method of transforming data in a database stored on a data storage device as set forth in claim 1, further comprising:

storing information corresponding to results of the invoking step in a history file.

22. The method of transforming data in a database stored on a data storage device as set forth in claim 1, wherein:

the defining of at least one business view includes defining at least a first business view and a second business view;

the creating of at least one scheduled instance of operation of the transformation program includes selectively scheduling the first business view and the second business view to run concurrently; and the invoking of the at least one scheduled instance of operation of the transformation program includes invoking a first scheduled instance of operation of the transformation under control of the first business view and invoking a second scheduled instance of operation of the transformation under control of the second business view, said first and second invoked scheduled instances running concurrently.

23. The method of transforming data in a database stored on a data storage device as set forth in claim 1, wherein the invoking of the at least one scheduled instance of operation of the transformation program under control of the at least one business view includes:

retrieving a copy of the program template;

passing the parameter string of the business view to the retrieved copy of the program template and thereby selectively modifying the default parameters of the retrieved copy of the program template; and starting an instance of operation of the transformation program, said instance receiving the selectively modified default parameters of the retrieved copy of the program template.

24. An apparatus for transforming data in a database, comprising:

a computer having a memory and a data storage device coupled thereto, wherein the data storage device stores the database;

one or more computer programs, performed by the computer, retrieving a program template containing parameters corresponding to parameters of a pre-existing transformation program, invoking a business view with the program template, the business view including scheduling information and a parameter string initialized to default parameter values, and, under control of the business view, based on said scheduling information and said parameter string, invoking said transformation program that transforms source data to generate target data using the parameters provided in the program template.

25. The apparatus of claim 24, wherein the program template contains tokens which are replaced by system data at the time the transformation program is invoked.

26. The apparatus of claim 24, wherein the transformation program is a command.

27. The apparatus of claim 24, wherein the transformation program is a utility.

28. The apparatus of claim 24, wherein the business view is invoked based on a predefined schedule.

29. The apparatus of claim 24, wherein the program template comprises information about the transformation program.

30. The apparatus of claim 24, wherein the source is identified in the business view.

31. The apparatus of claim 24, wherein the transformation program is identified in the business view.

32. The apparatus of claim 24, wherein the target is identified in the business view.

33. The apparatus of claim 24, wherein the source file is identified in the program template.

34. The apparatus of claim 24, wherein the target file is identified in the program template.

35. The apparatus of claim 24, wherein the transformation is identified in the program template.

36. The apparatus of claim 24, further comprising means for storing results of the invocation of the transformation program in a history file.

37. An article of manufacture comprising a program storage medium readable by a computer and embodying one or more instructions executable by the computer to perform method steps for transforming data in a database operation on a database stored on a data storage device, the method comprising the steps of:

retrieving a program template containing parameters corresponding to parameters of a pre-existing transformation program;

invoking a business view with the program template, the business view including scheduling information and a parameter string initialized to default parameter values; and under control of the business view based on said scheduling information and said parameter string, invoking said transformation program that transforms source data to generate target data using the parameters provided in the program template.

38. The article of manufacture of claim 37, wherein the program template contains tokens which are replaced by system data at the time the transformation program is invoked.

39. The article of manufacture of claim 37, wherein the transformation program is a command.

40. The article of manufacture of claim 37, wherein the transformation program is a utility.

41. The article of manufacture of claim 37, wherein the business view is invoked based on a predefined schedule.

42. The article of manufacture of claim 37, wherein the program template comprises information about the transformation program.

43. The article of manufacture of claim 37, wherein the source is identified in the business view.

44. The article of manufacture of claim 37, wherein the transformation program is identified in the business view.

45. The article of manufacture of claim 37, wherein the target is identified in the business view.

46. The article of manufacture of claim 37, wherein the source file is identified in the program template.

47. The article of manufacture of claim 37, wherein the target file is identified in the program template.

48. The article of manufacture of claim 37, wherein the transformation is identified in the program template.

49. The article of manufacture of claim 37, further comprising storing results of the invocation of the transformation program in a history file.

50. A system for creating and scheduling data transformation operations using an associated transformation program in a data warehouse, comprising:

a template corresponding to the associated transformation program, said template including a set of default parameter values for parameters of the transformation program;

a business view in operative communication with the template and including a parameter string comprising values for parameters of the transformation program; and means for invoking an instance of operation of the transformation program under the control of the business view.

51. The system as set forth in claim 50, further comprising:

a business view generator having:
means for initializing the parameter string to comprise the default parameter values of the template, and
means for selective user modification of the parameter string of the business view.

52. The system as set forth in claim 51, wherein the means for selective user modification of the parameter string of the business view includes:

an interactive graphical user interface by which the user selectively modifies the parameter values contained in the parameter string.

53. The system as set forth in claim 50, wherein the business view further includes:

scheduling information whereby the means for invoking an instance of operation of the transformation program under the control of the business view invokes the instance at one or more times according to the scheduling information.

54. The system as set forth in claim 50, further comprising:

an operations file that stores information on the success or failure of the invoked instance of operation of the transformation program.

55. An apparatus for transforming data in a database, comprising:

a computer having a memory and a data storage device coupled thereto, wherein the data storage device stores the database; and one or more computer programs, performed by the computer, for performing a method comprising:

defining a program template containing default parameter values corresponding to parameters of a pre-existing transformation program, defining at least one business view having an association with the program template, said business view including scheduling information and a parameter string initialized to the default parameter values, creating at least one scheduled instance of operation of the transformation program by receiving selective modifications of the parameter string and the scheduling information of the at least one business view from the user, and invoking the at least one scheduled instance of operation of the transformation program under control of the at least one business view.

56. The apparatus as set forth in claim 55, wherein the creating of at least one scheduled instance of operation of the transformation program includes:

displaying the parameter values of the parameter string;

receiving selective modifications of the displayed parameter values from the user; and updating the parameter string based on the received selective modifications.

57. The apparatus as set forth in claim 55, wherein the defining of said program template includes:

defining a program template using a graphical user interface.

58. The apparatus as set forth in claim 55, wherein:

the defining of said program template containing default parameter values corresponding to parameters of a pre-existing transformation program includes defining at least one default parameter value as a token; and the invoking of the at least one scheduled instance of operation of the transformation program under control of the at least one business view includes replacing the token with a system data value corresponding to the token.

59. The apparatus as set forth in claim 55, wherein the defining of said program template containing default parameter values corresponding to parameters of a pre-existing transformation program includes:

defining a program template for a pre-existing transformation program, said pre-existing transformation program being one of an SQL query and a data warehouse program.

60. The apparatus as set forth in claim 55, wherein the defining of said program template includes:

storing metadata relating to the pre-existing transformation program in the program template.

61. The apparatus as set forth in claim 60, wherein the storing of metadata relating to the pre-existing transformation program in the program template includes:

storing at least one of a business name, a physical name, an executable file type, a description, and a server agent at which the data warehouse program is installed with a specified physical name.

62. The apparatus as set forth in claim 55, wherein the defining of a program template containing default parameter values corresponding to parameters of said pre-existing transformation program includes:

defining a program template containing default parameter values specifying default source and target parameter values relating to the pre-existing transformation program.

63. The apparatus as set forth in claim 55, further comprising:

storing information corresponding to results of the invoking step in a history file.

64. The apparatus as set forth in claim 55, wherein:

the defining of at least one business view includes defining at least a first business view and a second business view;

the creating of at least one scheduled instance of operation of the transformation program includes selectively scheduling the first business view and the second business view to run concurrently; and the invoking of the at least one scheduled instance of operation of the transformation program includes invoking a first scheduled instance of operation of the transformation under control of the first business view and invoking a second scheduled instance of operation of the transformation under control of the second business view, said first and second invoked scheduled instances running concurrently.

65. The apparatus as set forth in claim 55, wherein the invoking of the at least one scheduled instance of operation of the transformation program under control of the at least one business view includes:

retrieving a copy of the program template;

passing the parameter string of the business view to the retrieved copy of the program template and thereby selectively modifying the default parameters of the retrieved copy of the program template; and starting an instance of operation of the transformation program, said instance receiving the selectively modified default parameters of the retrieved copy of the program template.

66. An article of manufacture comprising a program storage medium readable by a computer and embodying one or more instructions executable by the computer to perform a method for transforming data in a database operation on a database stored on a data storage device, the method comprising:

defining a program template containing default parameter values corresponding to parameters of a pre-existing transformation program;

defining at least one business view having an association with the program template, said business view including scheduling information and a parameter string initialized to the default parameter values;

creating at least one scheduled instance of operation of the transformation program by receiving selective modifications of the parameter string and the scheduling information of the at least one business view from the user; and invoking the at least one scheduled instance of operation of the transformation program under control of the at least one business view.

67. The article of manufacture as set forth in claim 66, wherein the creating of at least one scheduled instance of operation of the transformation program includes:

displaying the parameter values of the parameter string;

receiving selective modifications of the displayed parameter values from the user; and updating the parameter string based on the received selective modifications.

68. The article of manufacture as set forth in claim 66, wherein the defining of said program template includes:

defining a program template using a graphical user interface.

69. The article of manufacture as set forth in claim 66, wherein:

the defining of said program template containing default parameter values corresponding to parameters of a pre-existing transformation program includes defining at least one default parameter value as a token; and the invoking of the at least one scheduled instance of operation of the transformation program under control of the at least one business view includes replacing the token with a system data value corresponding to the token.

70. The article of manufacture as set forth in claim 66, wherein the defining of said program template containing default parameter values corresponding to parameters of a pre-existing transformation program includes:

defining a program template for a pre-existing transformation program, said pre-existing transformation program being one of an SQL query and a data warehouse program.

71. The article of manufacture as set forth in claim 66, wherein the defining of said program template includes:

storing metadata relating to the pre-existing transformation program in the program template.

72. The article of manufacture as set forth in claim 71, wherein the storing of metadata relating to the pre-existing transformation program in the program template includes:

storing at least one of a business name, a physical name, an executable file type, a description, and a server agent at which the data warehouse program is installed with a specified physical name.

73. The article of manufacture as set forth in claim 66, wherein the defining of said program template containing default parameter values corresponding to parameters of a pre-existing transformation program includes:

defining a program template containing default parameter values specifying default source and target parameter values relating to the pre-existing transformation program.

74. The article of manufacture as set forth in claim 66, further comprising:

storing information corresponding to results of the invoking step in a history file.

75. The article of manufacture as set forth in claim 66, wherein:

the defining of at least one business view includes defining at least a first business view and a second business view;

the creating of at least one scheduled instance of operation of the transformation program includes selectively scheduling the first business view and the second business view to run concurrently; and the invoking of the at least one scheduled instance of operation of the transformation program includes invoking a first scheduled instance of operation of the transformation under control of the first business view and invoking a second scheduled instance of operation of the transformation under control of the second business view, said first and second invoked scheduled instances running concurrently.

76. The article of manufacture as set forth in claim 66, wherein the invoking of the at least one scheduled instance of operation of the transformation program under control of the at least one business view includes:

retrieving a copy of the program template;

passing the parameter string of the business view to the retrieved copy of the program template and thereby selectively modifying the default parameters of the retrieved copy of the program template; and starting an instance of operation of the transformation program, said instance receiving the selectively modified default parameters of the retrieved copy of the program template.

\* \* \* \* \*